(12) United States Patent
Lee et al.

(10) Patent No.: US 10,038,212 B2
(45) Date of Patent: Jul. 31, 2018

(54) RECHARGEABLE BATTERY HAVING ELECTRODE TAP AND MANUFACTURING METHOD THEREOF

(71) Applicant: Samsung SDI Co., Ltd., Yongin-si, Gyeonggi-do (KR)

(72) Inventors: Jin-Hyon Lee, Yongin-si (KR); Eun-Young Goh, Yongin-si (KR); Ji-Woon Lee, Yongin-si (KR); Sang-In Park, Yongin-si (KR); Jin-Seon Shin, Yongin-si (KR); Sung-Yong Kim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 139 days.

(21) Appl. No.: 15/260,713

(22) Filed: Sep. 9, 2016

(65) Prior Publication Data

US 2017/0117574 A1 Apr. 27, 2017

(30) Foreign Application Priority Data

Oct. 27, 2015 (KR) ........................ 10-2015-0149640

(51) Int. Cl.
| | |
|---|---|
| *H01M 10/0525* | (2010.01) |
| *H01M 10/04* | (2006.01) |
| *H01M 2/20* | (2006.01) |
| *H01M 2/26* | (2006.01) |
| *H01M 2/22* | (2006.01) |

(52) U.S. Cl.
CPC ....... *H01M 10/0431* (2013.01); *H01M 2/202* (2013.01); *H01M 2/263* (2013.01); *H01M 10/0459* (2013.01); *H01M 2/22* (2013.01); *H01M 2220/20* (2013.01); *H01M 2220/30* (2013.01)

(58) Field of Classification Search
CPC ..................... H01M 10/0431; H01M 10/0525
See application file for complete search history.

(56) References Cited

U.S. PATENT DOCUMENTS

| | | |
|---|---|---|
| 2011/0104539 A1 | 5/2011 | Oh et al. |
| 2012/0009450 A1 | 1/2012 | Chun |

FOREIGN PATENT DOCUMENTS

| | | |
|---|---|---|
| KR | 10-1192056 B1 | 8/2009 |
| KR | 10-1147237 B1 | 1/2012 |

*Primary Examiner* — Olatunji Godo
(74) *Attorney, Agent, or Firm* — Knobbe, Martens, Olson & Bear, LLP

(57) ABSTRACT

A rechargeable battery according to an exemplary embodiment of the present invention includes an electrode assembly including: a first electrode plate including first and second coated regions where an active material layer is formed and a first uncoated region positioned between the first and second coated regions and not formed with the active material layer and folded at the first uncoated region; a second electrode plate inserted between the first electrode plate; and a first separator inserted between the first and second electrode plates, and a first electrode tab bonded to the first uncoated region, wherein the first electrode plate, the second electrode plate, and the first separator are wound after they are stacked.

20 Claims, 18 Drawing Sheets

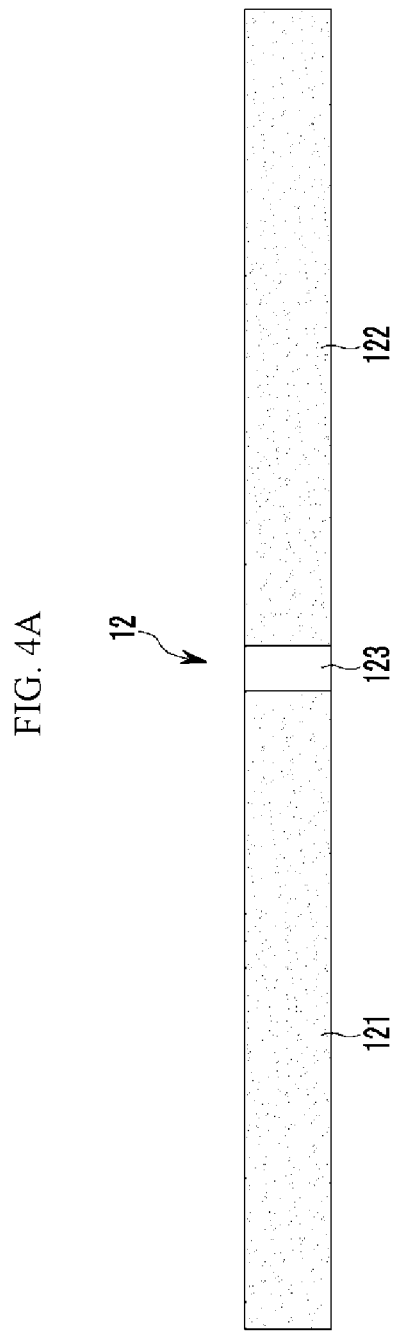

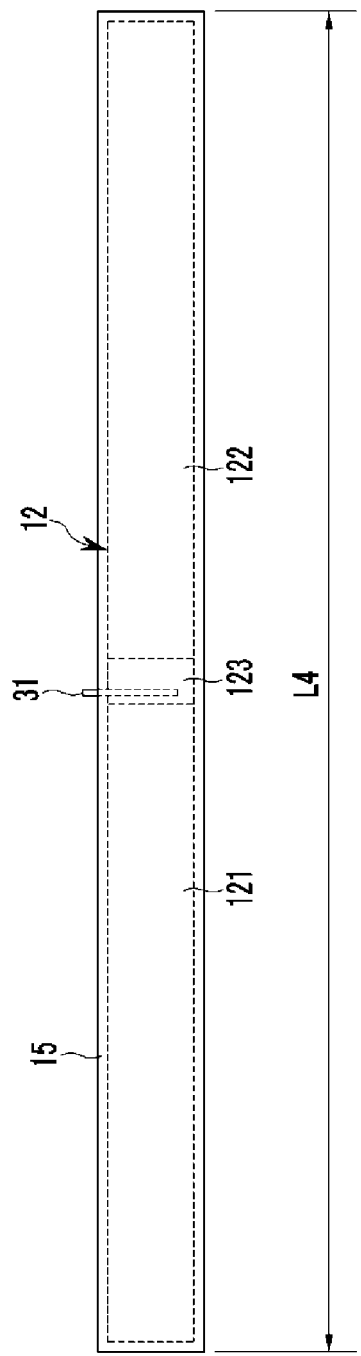

RECHARGEABLE BATTERY HAVING ELECTRODE TAP AND MANUFACTURING METHOD THEREOF

RELATED APPLICATIONS

This application claims priority to and the benefit of Korean Patent Application No. 10-2015-0149640 filed in the Korean Intellectual Property Office on Oct. 27, 2015, the entire contents of which are incorporated herein by reference.

BACKGROUND

Field

The present invention relates to a rechargeable battery and a manufacturing method of a rechargeable battery, and more particularly, to a rechargeable battery having an electrode tab and a manufacturing method thereof.

Description of the Related Art

A rechargeable battery differs from a primary battery in that it can be repeatedly charged and discharged, while the latter is incapable of being recharged. Low-capacity rechargeable batteries are used in small portable electronic devices such as mobile phones, notebook computers, and camcorders, while high-capacity rechargeable batteries are widely used for example as a power source for driving a motor of a hybrid vehicle.

Recently, a high power rechargeable battery using a non-aqueous electrolyte and having high energy density has been developed. These consist of a large-capacity rechargeable battery in which a plurality of rechargeable batteries are connected in series, such that it can be used as a power source for driving a motor of a device requiring a large amount of electric power, for example, an electric vehicle or the like.

In addition, a single high-capacity rechargeable battery generally includes a plurality of rechargeable batteries that are connected in series, and the rechargeable battery may have a cylindrical shape, a prismatic shape, etc. In addition, the rechargeable battery includes an electrode assembly for performing charging and discharging operations, and the electrode assembly includes a positive electrode, a negative electrode, and a separator interposed between the positive electrode and the negative electrode. The electrode assembly may have a structure in which a plurality of positive and negative electrode plates are stacked or a structure in which strip-shaped positive and negative electrodes are wound.

When the electrodes are wound, a front end of the electrode assembly is fixed to a winding center, the electrode assembly is wound around the winding center, and the winding center is removed form a center of the electrode assembly. When the electrodes are wound, they may be miswound and alignment of the electrode assembly may be disturbed.

The above information disclosed in this Background section is only to enhance the understanding of the background of the invention, and therefore it may contain information that does not form the prior art that is already known in this country to a person of ordinary skill in the art.

SUMMARY OF CERTAIN INVENTIVE ASPECTS

The present invention provides a rechargeable battery that can prevent miswinding, and a manufacturing method thereof.

A rechargeable battery according to an exemplary embodiment of the present invention includes: an electrode assembly including: a first electrode plate including first and second coated regions where an active material layer is formed and a first uncoated region positioned between the first and second coated regions and not formed with the active material layer and folded at the first uncoated region; a second electrode plate inserted between the first electrode plate; and a first separator inserted between the first and second electrode plates, and a first electrode tab bonded to the first uncoated region, wherein the first electrode plate, the second electrode plate, and the first separator are wound after they are stacked.

The first uncoated region may be positioned in an innermost wound portion of the electrode assembly, the first separator may be folded together with the first electrode plate to enclose the second electrode plate, and the second electrode plate may be unfolded.

The rechargeable battery may further include a second separator disposed outside of the first electrode plate and a third electrode plate stacked on the second separator, the second electrode plate and the third electrode plate may have the same polarity, and the first electrode plate may have a different polarity than the second electrode plate.

The first electrode plate may have a first length, the second electrode plate may have a second length that is shorter than the first length, the third electrode plate may have a third length that is shorter than the first length, and the first length may be 1.8 times to 2.2 times the second length and the third length. The second separator may be formed such that it is folded to enclose the third electrode plate.

The rechargeable battery may further include a third separator disposed outside of the third electrode plate, wherein the first separator has a fourth length, the second separator has a fifth length, and the third separator has a sixth length, and the fourth length is 1.8 times to 2.2 times the fifth length and the sixth length.

The rechargeable battery may further include a second electrode tab that is welded to the first uncoated region and is overlapped with the first electrode tab while interposing the first electrode plate therebetween, the first electrode tab may be inserted in between the folded first electrode plate, and the second electrode tab may be positioned outside of the first electrode plate.

The first electrode tab and the second electrode tab may be bonded to the outside of the first electrode plate such that they are separated from each other while interposing the first electrode plate therebetween, and the first electrode tab and the second electrode tab may be disposed away from a center of the first uncoated region in a width direction thereof.

The second electrode plate may include a third coated region where an active material layer is formed and a second uncoated region positioned in an end portion of the second electrode plate in a length direction thereof and where an active material layer is not formed, the third electrode plate may include a fourth coated region in which an active material layer is formed and a third uncoated region positioned in an end portion of the third electrode plate in a length direction thereof and where an active material layer is not formed, the electrode assembly may further include a third electrode tab bonded to the second uncoated region and a fourth electrode tab bonded to the third uncoated region, and the third electrode tab and the fourth electrode tab may be positioned in an outermost wound portion of the electrode assembly.

A method of manufacturing a rechargeable battery comprising: providing a first electrode plate having a first uncoated region formed between a first coated layer and a second coating layer and a second electrode plate wherein the first uncoated region includes a first electrode tab; positioning the second electrode plate and a first separator adjacent a first uncoated region of the first electrode plate; folding the first electrode plate at the first uncoated region to enclose the second electrode plate with the first electrode plate and the first separator; and winding the folded first electrode plate and the second electrode plate using he first electrode tab provided in the first uncoated region as a winding center.

The manufacturing method of the rechargeable battery may include: positioning the first separator on the first electrode plate having a first length; positioning the second electrode plate having a second length smaller than the first length on the first separator; folding the first electrode plate and the first separator in order for the first separator and the first electrode plate to enclose the second electrode plate; positioning the second separator outside of the first electrode plate; positioning a third electrode plate having a third length smaller than the first length on the second separator; and winding them around the first electrode tab provided in the first uncoated region.

The manufacturing method may further include: bonding the first electrode tab to the first uncoated region; and bonding the second electrode tab to the first uncoated region to face the first electrode tab.

The manufacturing method of the rechargeable battery may further include providing a third electrode tab in the second electrode plate and providing a fourth electrode tab in the third electrode plate. The winding may include positioning the first electrode tab and the second electrode tab in an innermost wound portion of the electrode assembly, and positioning the third electrode tab and the fourth electrode tab in an innermost wound portion of the electrode assembly.

The manufacturing method of the rechargeable battery may further include positioning a third separator on the third electrode plate, and folding of the second separator by folding the second separator to enclose the second electrode plate.

According to the exemplary embodiment of the present invention, since the electrode tab is provided in the uncoated region formed between the coated regions and the first electrode plate is folded to enclose the second electrode plate, the electrode assembly can be wound around the winding center to minimize miswinding.

BRIEF DESCRIPTION OF THE DRAWINGS

FIG. 4A is a top plan view of a first electrode plate according to the first exemplary embodiment of the present invention.

FIG. 4C is a top plan view of a state in which a first separator is provided on the first electrode plate.

DETAILED DESCRIPTION OF CERTAIN INVENTIVE EMBODIMENTS

Figure 1:
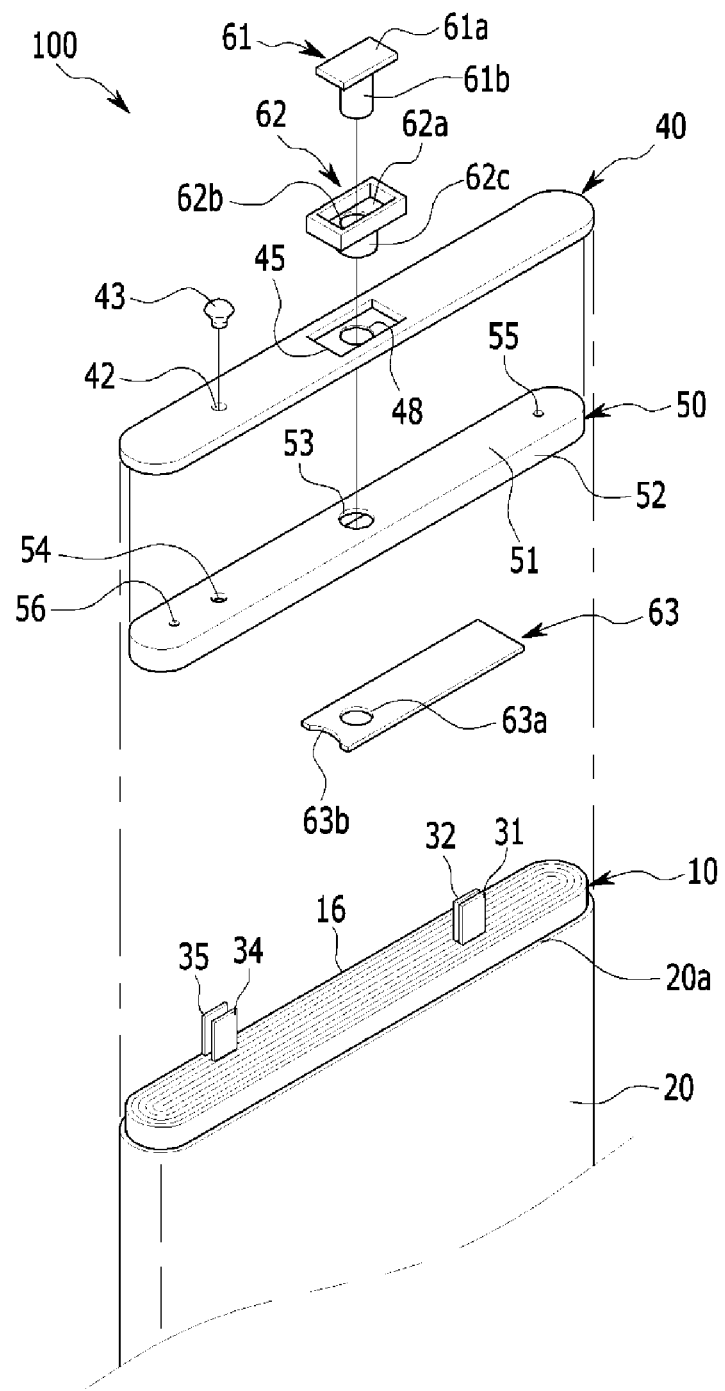
FIG. 1 is an exploded perspective view of a rechargeable battery according to a first exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. In addition, like reference numerals designate like elements throughout the specification and the drawings.

Figure 2:
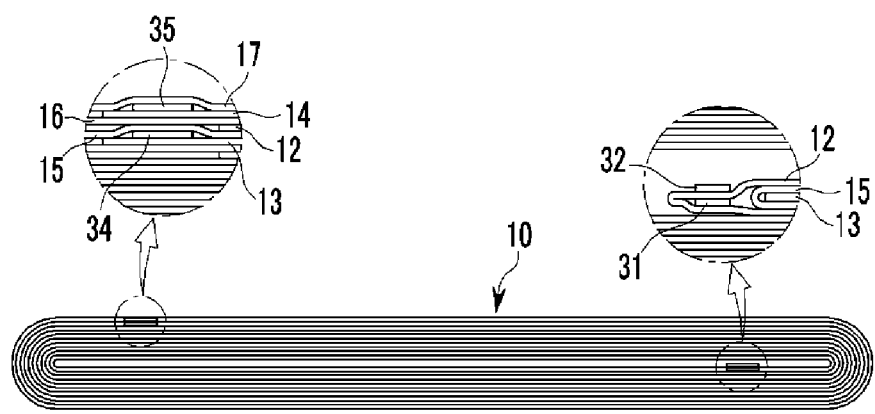
FIG. 2 is a cross-sectional view of an electrode assembly according to the first exemplary embodiment of the present invention.

FIG. 1 is an exploded perspective view of a rechargeable battery according to a first exemplary embodiment of the present invention, and FIG. 2 is a cross-sectional view of an electrode assembly according to the first exemplary embodiment of the present invention.

Referring to FIGS. 1 and 2, the rechargeable battery 100 according to the current first exemplary embodiment includes: an electrode assembly 10; a case 20; an insulating member 50; a cap plate 40; a terminal 61; and a connection plate 63.

The rechargeable battery 100 according to the current exemplary embodiment will be exemplarily described as being a lithium ion rechargeable battery having a prismatic shape. However, the present invention is not limited thereto, and the present invention may be applied to various types of batteries such as a lithium polymer battery or a cylindrical type of battery, a pouch type of battery, and the like.

The case 20 has opposite side ends that have a rounded pillar shape, and an opening 20a is formed at one side of the case 20. The case 20 may be made of a metal such as aluminum, stainless steel, or the like. The case 20 provides an internal space for housing the electrode assembly 10 and an electrolyte solution, and may be electrically coupled to third and fourth electrode tabs 34 and 35 having positive polarity via the cap plate 40.

The cap plate 40 is combined to the opening 20a of the case 20 to close and seal the case 20, and is made of an electrically conductive metallic material such as aluminum or an aluminum alloy. The third and fourth electrode tabs 34 and 35 may be welded and bonded to a bottom surface of the cap plate 40. Accordingly, the cap plate 40 may be electrically coupled to the positive electrode.

A terminal hole 48 into which the terminal 61 is inserted and an electrolyte injection opening 42 into which the electrolyte solution is injected may be formed in the cap plate 40. A cap 43 is provided to be inserted into the electrolyte injection opening 42, thereby closing the electrolyte injection opening 42. The terminal hole 48 is formed at a center of the cap plate 40, and the terminal 61 may be provided in the terminal hole 48 via an insulating gasket 62. The terminal 61 may include a head 61a, and a pillar portion 61b extended downward from the head 61a. The head 61 a has a quadrangular plate shape, and has a wider cross-sectional area than the pillar portion 61b. The pillar portion 61b has a circular cylindrical shape, and may be inserted into the terminal hole 48.

The terminal 61 is provided to penetrate the cap plate 40, the insulating member 50, and the connection plate 63, and may be fixed to the cap plate 40 by riveting. The insulating gasket 62 may include a groove portion 62a into which the head 61a is inserted, and a lower insulating portion 62b that is extended downward from the groove portion 62a to enclose the pillar portion 61b. The insulating gasket 62 prevents the terminal 61 and the cap plate 40 from directly contacting each other, and is made of a polymer having an insulating property.

The insulating member 50 for insulating the connection plate 63 from the cap plate 40 is provided under the cap plate 40. The insulating member 50 includes a base plate 51 that contacts the bottom surface of the cap plate 40, and a support rib 52 that protrudes from the base plate 51 to contact an inner surface of the case 20. The base plate 51 is disposed parallel to the cap plate 40, and is fixed to the bottom surface of the cap plate 40. The base plate 51 has a plate shape extending in one direction, opposite ends of which in a length direction are rounded. In addition, a hole 53 through which the terminal 61 penetrates, and a coupling hole 54, which is formed under the electrolyte injection opening 42 to be connected to the electrolyte injection opening 42, may be formed in the base plate 51.

On the other hand, the connection plate 63 is disposed under the insulating member 50, and the connection plate 63 is fixed to the cap plate by the terminal 61. The connection plate 63 has a plate shape that extends in one direction, and a hole 63a through which the terminal 61 penetrates is formed in the connection plate 63. The connection plate 63 is disposed parallel to the cap plate 40, and the first and second electrode tabs 31 and 32 are fixed to a bottom surface of the connection plate 63 by welding. Accordingly, the terminal 61 may be electrically coupled to a negative electrode via the connection plate 63.

The electrode assembly 10 includes: a first electrode plate 12; a second electrode plate 13; a third electrode plate 14; a first separator 15 disposed between the first electrode plate 12 and the second electrode plate 13; a second separator 16 disposed between the first electrode plate 12 and the third electrode plate 14; and a third separator 17 disposed outside of the third electrode plate 14.

The first electrode plate 12 includes a first substrate 12a, and a first active material layer 12b formed on the first substrate 12a. The first substrate 12a may be made of copper, and the first active material layer 12b may be made of a negative electrode active material. The second electrode plate 13 includes a second substrate 13a, and a second active material layer 13b formed on the second substrate 13a. The second substrate 13a may be made of aluminum, and the second active material layer 13b may be made of a positive electrode active material. The third electrode plate 14 includes a third substrate 14a, and a third active material layer 14b formed on the third substrate 14a. The third substrate 14a may be made of aluminum, and the third active material layer 14b may be made of a positive electrode active material.

The current first exemplary embodiment illustrates that the first electrode plate 12 serves as a negative electrode while the second electrode plate 13 and the third electrode plate 14 serve as a positive electrode, but the present invention is not limited thereto, and the first electrode plate 12 may serve as a positive electrode while the second electrode plate 13 and the third electrode plate 14 may serve as a negative electrode.

The first separator 15, the second separator 16, and the third separator 17 are extended to have a ribbon shape, and made of a porous polymer.

Figure 4B:
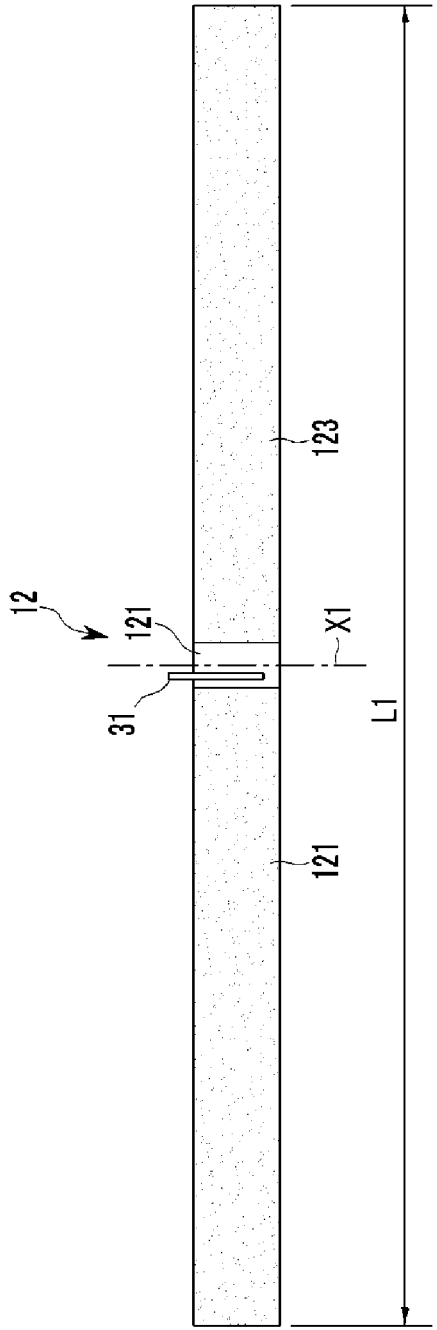
FIG. 4B is a top plan view of a state in which a first electrode tab is provided in the first electrode plate.
Figure 4D:
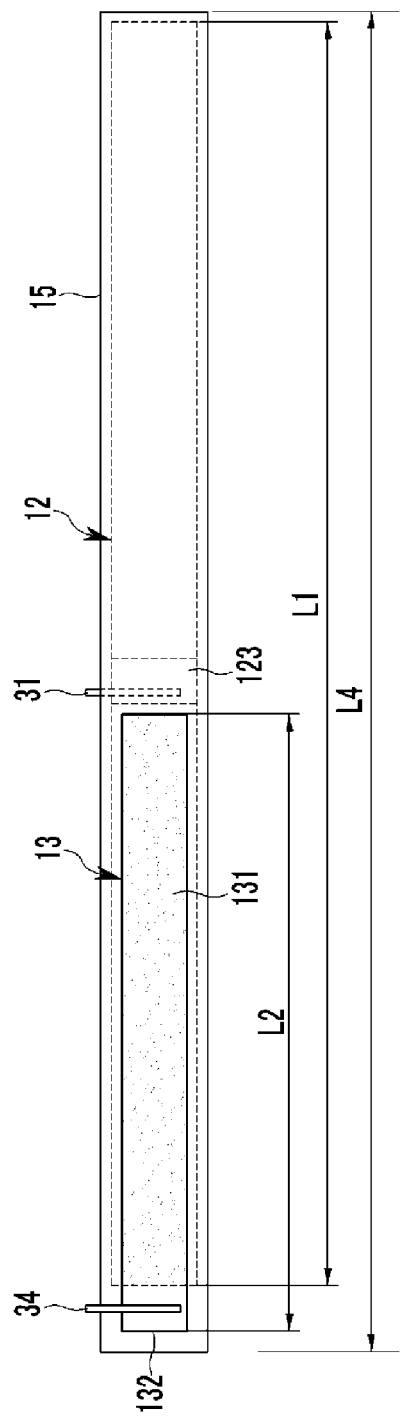
FIG. 4D is a top plan view of a state in which a second electrode plate is provided on the first separator.
Figure 4E:
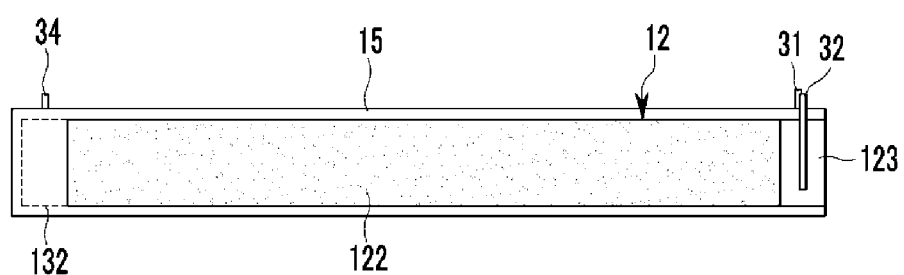
FIG. 4E is a top plan view of a state in which the first electrode plate and the first separator are folded.
Figure 4F:
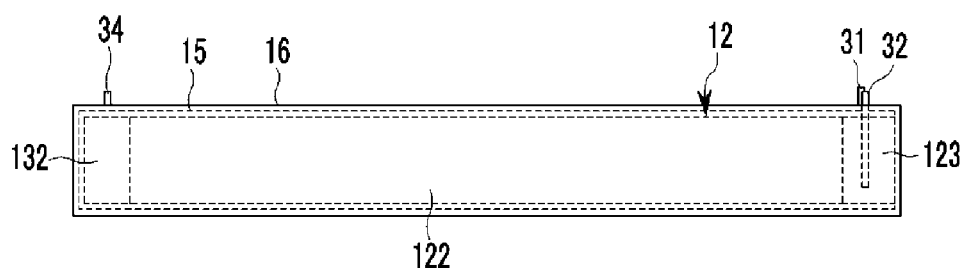
FIG. 4F is a top plan view of a state in which a second separator is provided on the first electrode plate.
Figure 4G:
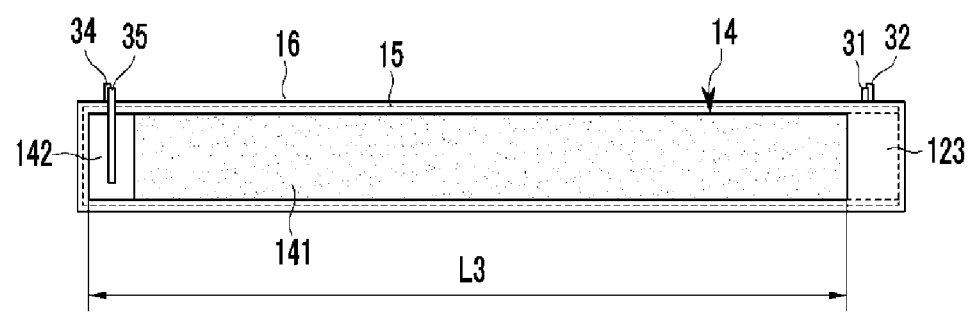
FIG. 4G is a top plan view of a state in which a third electrode plate is provided on the second separator.
Figure 4H:
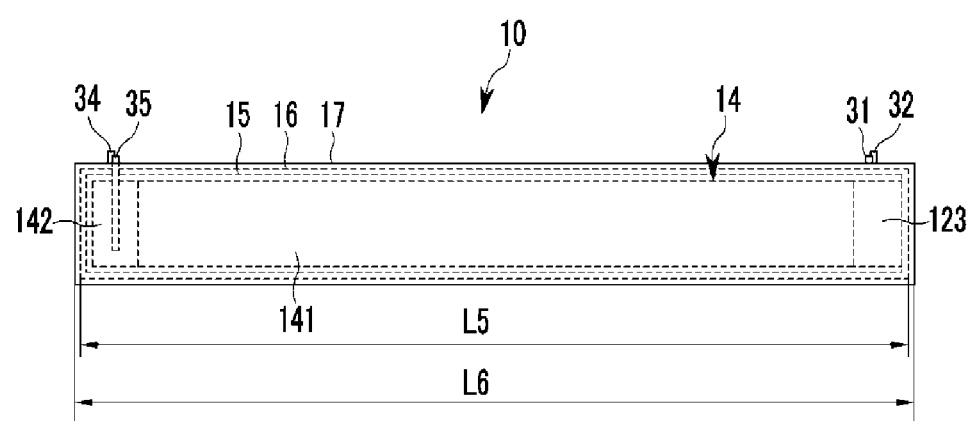
FIG. 4H is a top plan view of a state in which a third separator is provided on the third electrode plate.

FIG. 4A is a top plan view of a first electrode plate according to the first exemplary embodiment of the present invention, FIG. 4B is a top plan view of a state in which a first electrode tab is provided in the first electrode plate, FIG. 4C is a top plan view of a state in which a first separator is provided on the first electrode plate, FIG. 4D is a top plan view of a state in which a second electrode plate is provided on the first separator, FIG. 4E is a top plan view of a state in which the first electrode plate and the first separator are folded, FIG. 4F is a top plan view of a state in which a second separator is provided on the first electrode plate, FIG. 4G is a top plan view of a state in which a third electrode plate is provided on the second separator, and FIG. 4H is a top plan view of a state in which a third separator is provided on the third electrode plate.

Now, a description will be made with reference to FIGS. 4A to 4G. As shown in FIG. 4A, the first electrode plate 12 includes first and second coated regions 121 and 122 where the first active material layer 12b is formed, and a first uncoated region 123 where the first substrate 12a is exposed since the first active material layer 12b is not formed. The first coated region 121 and the second coated region 122 may be disposed to be separated from each other while interposing the first uncoated region 123 therebetween. The first uncoated region 123 may be disposed at a center of the first electrode plate 12 in a length direction thereof, and the first uncoated region 123 is formed at opposite surfaces of the first electrode plate 12.

Figure 3:
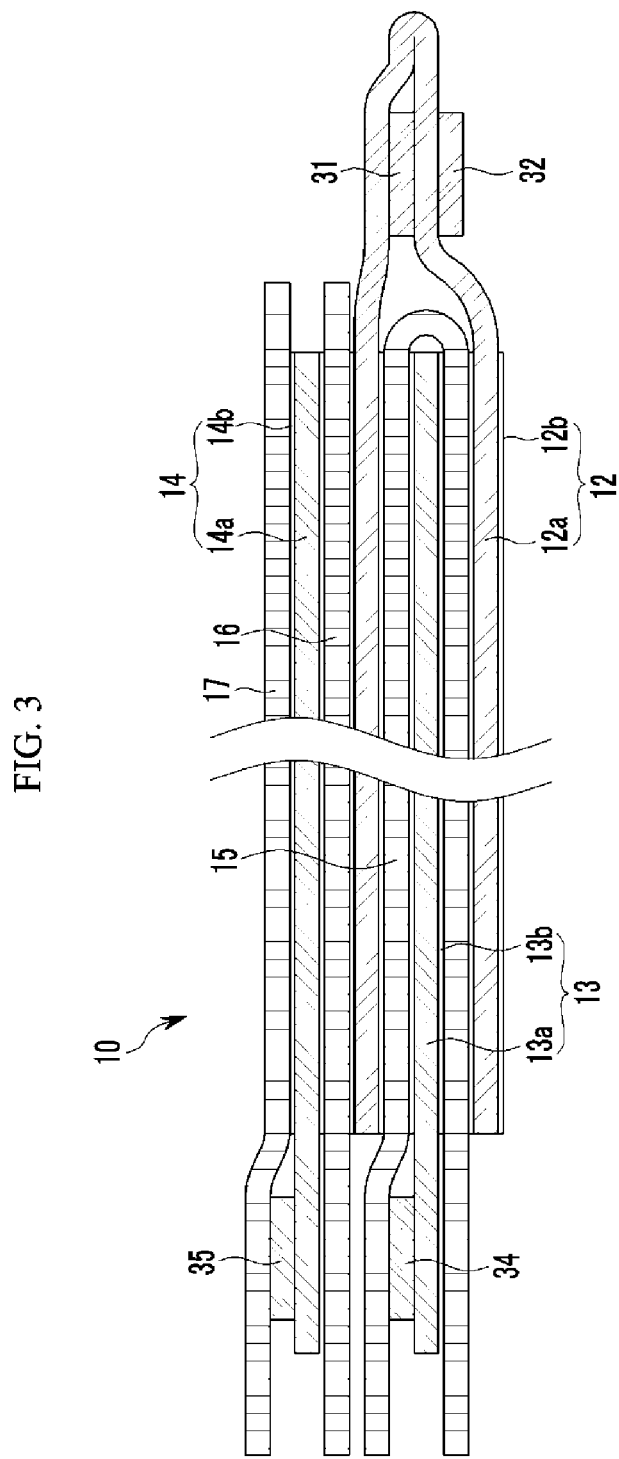
FIG. 3 is a cross-sectional view of an electrode assembly according to the first exemplary embodiment of the present invention after it is unfolded.

The first electrode tab 31 is welded to one surface of the first uncoated region 123, while the second electrode tab 32 is welded to the other surface of the first uncoated region 123. As shown in FIG. 3, the first electrode tab 31 inserted in between of the folded first electrode plate 12, and the second electrode tab 32 is positioned outside of the first electrode plate 12. In addition, as shown in FIG. 4B, the first electrode tab 31 and the second electrode tab 32 are disposed away from a center line X1 of the first uncoated region 123 in a width direction thereof. The first electrode tab 31 and the second electrode tab 32 are made of an electrically conductive material such as copper or nickel, and are electrically coupled to the terminal 61.

On the other hand, as shown in FIG. 4D, the second electrode plate 13 includes a third coated region 131 where the second active material layer 13b is formed and a second uncoated region 132 where the second substrate 13a is exposed since the second active material layer 13b is not formed, and the second uncoated region 132 is positioned in an end portion of the second electrode plate 13 in a length direction thereof. A third electrode tab 34 is welded to the second uncoated region 132.

As shown in FIG. 4G, the third electrode plate 14 includes a fourth coated region 141 where the third active material layer 14b is formed and a third uncoated region 142 where the third substrate 14a is exposed since the third active material layer 14b is not formed, and the third uncoated region 142 is positioned in an end portion of the third electrode plate 14 in a length direction thereof. A fourth electrode tab 35 is welded to the third uncoated region 142. The third electrode tab 34 and the fourth electrode tab 35 are made of an electrically conductive material such as nickel or aluminum, and are electrically coupled to the cap plate 40.

As shown in FIGS. 4D and 4G, the first electrode plate 12 has a first length L1, the second electrode plate 13 has a second length L2, and the third electrode plate 14 has a third length L3. Here, the first length L1 is greater than the second length L2 and the third length L3, and the first length L1 may be 1.8 times to 2.2 times the second length L2 and the third length L3.

As shown in FIGS. 4D and 4H, the first separator 15 has a fourth length L4, the second separator 16 has a fifth length L5, and the third separator 17 has a sixth length L6. Here, the fourth length L4 is greater than the fifth length L5 and the sixth length L6, and the fourth length L4 may be 1.8 times to 2.2 times the fifth length L5 and the sixth length L6.

As shown in FIG. 4D, the first separator 15 is positioned on the first electrode plate 12, and the second electrode plate 13 is positioned on the first separator 15. As shown in FIG. 4E, the first electrode plate 12 and the first separator 15 are folded to enclose the first electrode plate 12, and the second electrode plate 13 is not folded to maintain a flat state.

Accordingly, after being folded, the first electrode plate 12 is positioned at an outermost side, and the second separator 16, the third electrode plate 14, and the third separator 17 are sequentially stacked on the first electrode plate 12. The stacked electrode plates and separators are wound using the first electrode tab 31 and the second electrode tab 32 as a winding center, as illustrated in FIG. 2.

Accordingly, the first electrode tab 31 and the second electrode tab 32 are positioned in an innermost wound portion of the electrode assembly 10, while the third electrode tab 34 and the fourth electrode tab 35 are positioned in an outermost wound portion of the electrode assembly 10. Here, the wound portion refers to a portion that is wound once, and the innermost wound portion refers to a portion that is wound once from an inner end portion of the electrode assembly. In addition, the outermost wound portion refers to a portion that is wound once from an outer end portion of the electrode assembly.

A manufacturing method of a rechargeable battery according to the current first exemplary embodiment will now be described with reference to FIGS. 4A to 4H.

As shown in FIG. 4A, a ribbon-shaped first electrode plate, which includes a first coated layer, a second coated layer, and a first uncoated region positioned between the first coated layer and the second coated layer and is extended, is disposed while it is unfolded. As shown in FIG. 4B, the manufacturing method of the rechargeable battery according to the current first exemplary embodiment may include welding a first electrode tab 31 to the first uncoated region 123. Here, the first electrode plate 12 has a first length L1, and the first electrode tab 31 is disposed away from a center line X1 of the first uncoated region 123 in a width direction thereof.

In addition, the current manufacturing method of the rechargeable battery may, as shown in FIG. 4C, include positioning a first separator 15 having a fourth length L4 on the first electrode plate 12. The first separator 15 is formed longer than the first electrode plate 12 such that the first electrode plate 12 and the second electrode plate 13 are not short-circuited, so the fourth length L4 is longer than the first length L1.

In addition, the current manufacturing method of the rechargeable battery may, as shown in FIG. 4D, include positioning a second electrode plate 13 having a second length L2 on the first separator 15. The second electrode plate 13 may be disposed closer to one side of the first electrode plate 12 from a center in a length direction thereof. The second electrode plate 13 has a third coated region 131 and a second uncoated region 132, and the second uncoated region 132 is disposed to protrude further than a side end of the first electrode plate 12 in the length direction thereof so as not to overlap the first electrode plate 12. Here, the first length L1 may be 1.8 times to 2.2 times the second length L2. The current manufacturing method of the rechargeable battery may further include welding a third electrode tab 34 to the second uncoated region 132 of the rechargeable battery.

As shown in FIG. 4E, the current manufacturing method of the rechargeable battery may further include folding the first electrode plate 12 and the first separator 15 to enclose the second electrode plate 13 not folded with the first electrode plate 12 and the first separator 15. The first separator 15 is positioned between the first electrode plate 12 and the second electrode plate 13, and contacts a first surface of the first electrode plate 12 and a second surface opposite the first surface. The first electrode plate 12 is positioned at an outermost side due to folding. The current manufacturing method of the rechargeable battery may further include welding a second electrode tab 32 to the first uncoated region 123 such that the first uncoated region 123 faces the first electrode tab 31 at a surface opposite the surface of the first electrode plate 12 where the first electrode tab 31 is provided. The first electrode tab 31 and the second electrode tab 32 are disposed to overlap each other while interposing the first uncoated region 123 therebetween.

As shown in FIG. 4F, the current manufacturing method of the rechargeable battery may further include positioning a second separator 16 having a fifth length L5 on the first electrode plate 12. Here, the fifth length L5 may be half the fourth length L4. As shown in FIG. 4G, the current manufacturing method of the rechargeable battery may further include positioning a third electrode plate 14 having a third length L3 on the second separator 16. Here, the third length L3 may be the same as the second length L2. The third electrode plate 14 has a fourth coated region 141 where a third active material layer 14b is formed and a third uncoated region 142 where the third active material layer 14b is not formed, and the third uncoated region 142 may be disposed to overlap the second uncoated region 132.

As shown in FIG. 4H, the current manufacturing method of the rechargeable battery may further include positioning a third separator 17 having a sixth length L6 on the third electrode plate 14. Here, the sixth length L6 may be the same as the fifth length L5. In addition, the current manufacturing method of the rechargeable battery may, as shown in FIG. 2, further include winding the stacked electrode plates and separators using the first electrode tab 31 and the second electrode tab 32 as a winding center. In this case, the first electrode tab 31 and the second electrode tab 32 are wound to be positioned at an innermost wound portion, while the third electrode tab 34 and the fourth electrode tab 35 are wound to be positioned at an outermost wound portion.

In addition, the manufacturing method of the rechargeable battery according to the current exemplary embodiment may further include inserting an wound electrode assembly 10 into a case 20 and combining a cap plate 40 to the case 20.

As described above, according to the current first exemplary embodiment, the first electrode plate 12 and the first separator 15 are wound after they are folded, while the second electrode plate 13, the third electrode plate 14, the second separator 16, and the third separator 17 are wound after they are unfolded. In addition, the second electrode plate 13 and the third electrode plate 14 have the same polarity, and the first electrode plate 12 has different polarity than the second electrode plate 13 and the third electrode plate 14.

As described above, according to the current second exemplary embodiment, the number of windings may be reduced since the electrode plates are wound after they are folded. In addition, the electrode assembly 10 is wound around the first and second electrode tabs 31 and 32, and the number of windings is reduced, thereby minimizing miswinding.

An electrode assembly of a rechargeable battery according to a second exemplary embodiment will now be described.

Figure 5:
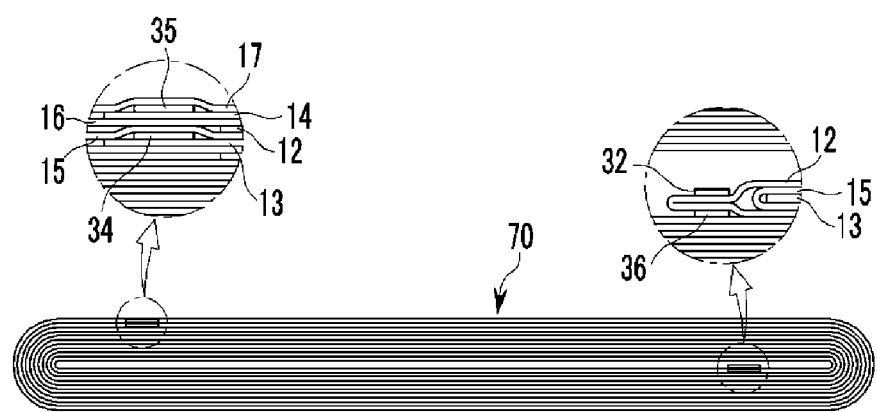
FIG. 5 is a cross-sectional view of an electrode assembly according to a second exemplary embodiment of the present invention.

FIG. 5 is a cross-sectional view of an electrode assembly according to a second exemplary embodiment of the present invention.

Referring to FIG. 5, the electrode assembly 70 according to the current second exemplary embodiment has the same structure as the electrode assembly according to the first exemplary embodiment described above, except for a position of the first electrode tab 36, so a repeated description of the same structure will be omitted.

The electrode assembly 70 according to the current second exemplary embodiment includes: a first electrode plate 12; a second electrode plate 13; a third electrode plate 14; a first separator 15 disposed between the first electrode plate 12 and the second electrode plate 13; a second separator 16 disposed between the second electrode plate 13 and the third electrode plate 14; and a third separator 17 disposed on the third electrode plate 14.

A first electrode tab 36 and a second electrode tab 32 are bonded to a first uncoated region 123 formed in the first electrode plate 12, and the first electrode tab 36 and the second electrode tab 32 are disposed outside of the folded first electrode plate 12. The first electrode tab 36 and the second electrode tab 32 are bonded to the first uncoated region 123 after the first electrode plate 12 is folded, and the first electrode tab 36 and the second electrode tab 32 are overlapped while interposing the first electrode plate therebetween.

A manufacturing method of a rechargeable battery according to the current second exemplary embodiment will now be described with reference to FIGS. 6A to 6C.

Figure 6A:
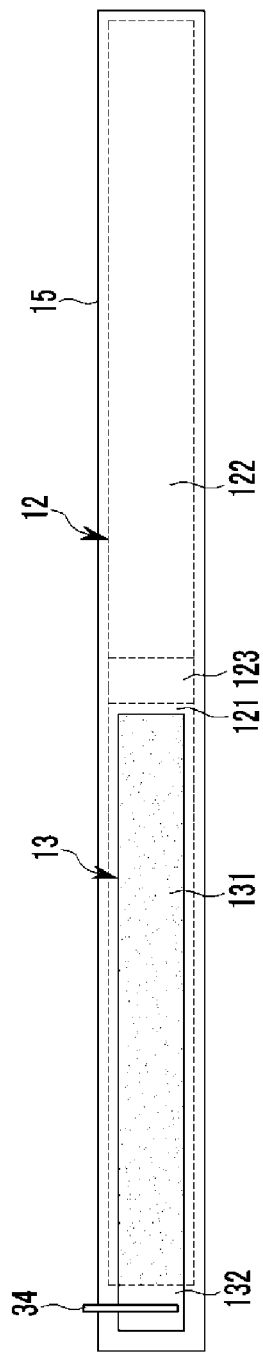
FIG. 6A is a top plan view of a state in which a second electrode plate is provided on the first separator.
Figure 6B:
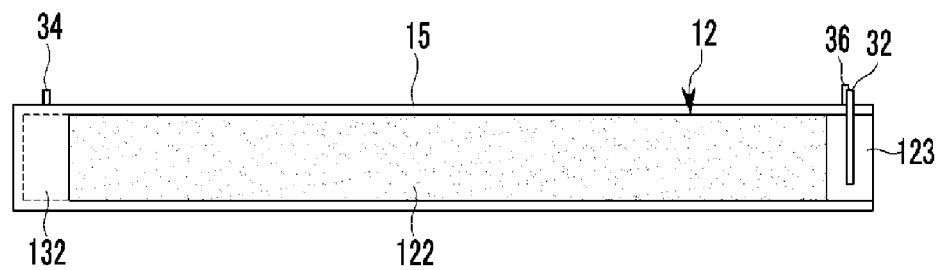
FIG. 6B is a top plan view of a state in which a first electrode plate and the first separator are folded.
Figure 6C:
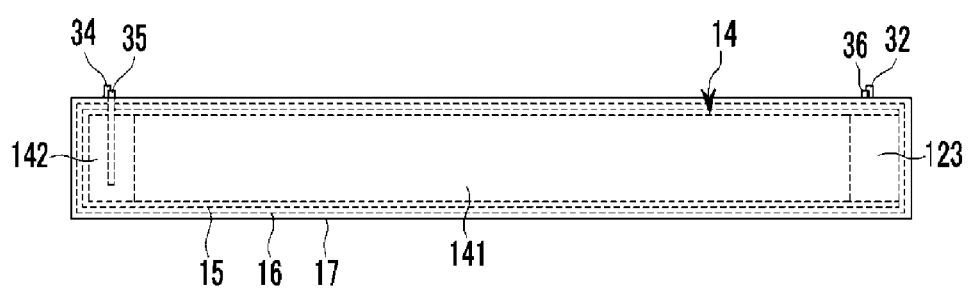
FIG. 6C is a top plan view of a state in which a second separator, a third electrode plate, and a third separator are provided on the first electrode plate.

FIG. 6A is a top plan view of a state in which a second electrode plate is provided on the first separator, FIG. 6B is a top plan view of a state in which a first electrode plate and the first separator are folded, and FIG. 6C is a top plan view of a state in which a second separator, a third electrode plate, and a third separator are provided on the first electrode plate.

As shown in FIG. 6A, the manufacturing method of the rechargeable battery according to the current second exemplary embodiment may include disposing a first separator 15 on a first electrode plate 12 and disposing a second electrode plate 13 on the first separator 15. In addition, the current manufacturing method of the rechargeable battery may include folding, as illustrated in FIG. 6B, the first separator 15 and the first electrode plate 12 together in this state to enclose the unfolded second electrode plate 13. The current manufacturing method of the rechargeable battery may include welding a first electrode tab 36 and a second electrode tab 32 to the first uncoated region 123 in a folded state. In this case, the first electrode tab 36 and the second electrode tab 32 are welded to the outside of the first electrode plate 12.

As shown in FIG. 6C, the manufacturing method of the rechargeable battery according to the current exemplary embodiment may further include sequentially stacking the second separator 16, the third electrode plate 14, and the third separator 17 on the first electrode plate 12 in the folded state, and winding the stacked electrode plates and separators.

As described above, according to the current second exemplary embodiment, since the first electrode tab 36 and the second electrode tab 32 are bonded to the outside of the first electrode plate 12, and the first electrode tab 36 and the second electrode tab 32 are disposed to overlap, an electrode assembly 70 may be wound using the first electrode tab 36 and the second electrode tab 32 as a winding center.

An electrode assembly of a rechargeable battery according to a third exemplary embodiment will now be described.

Figure 7:
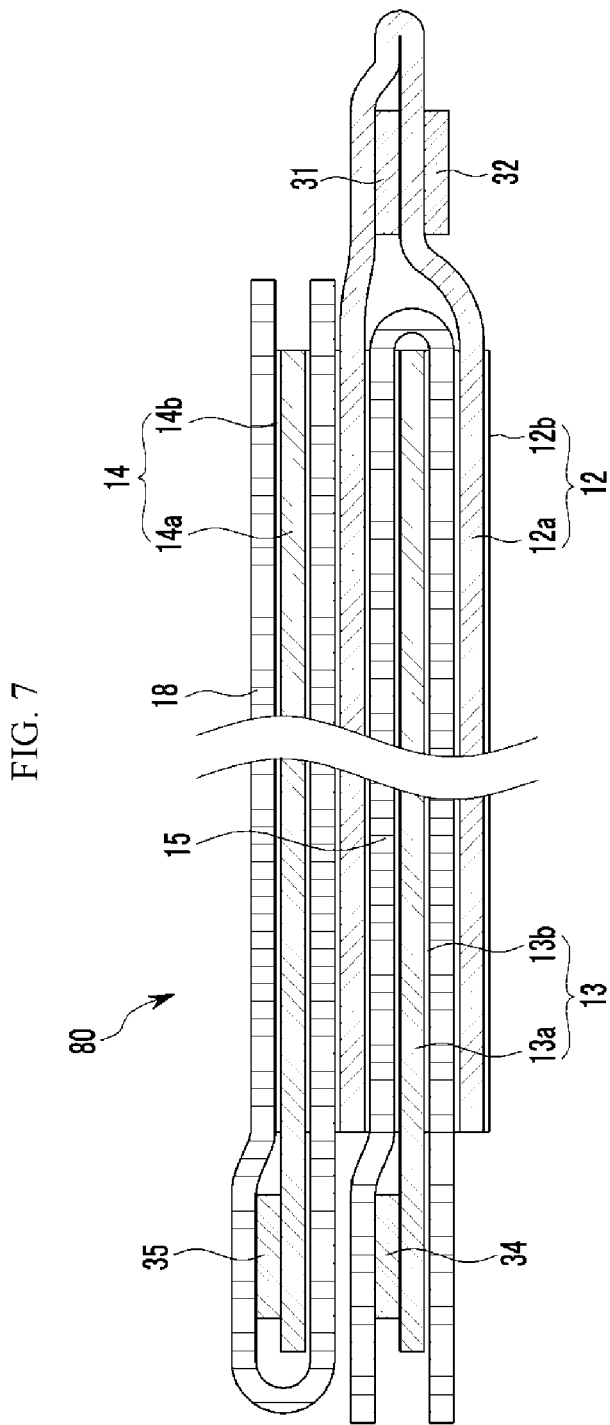
FIG. 7 is a cross-sectional view of an electrode assembly according to a third exemplary embodiment of the present invention after it is unfolded.

FIG. 7 is a cross-sectional view of an electrode assembly according to a third exemplary embodiment of the present invention after it is unfolded.

Referring to FIG. 7, the electrode assembly 80 according to the current third exemplary embodiment has the same structure as the electrode assembly according to the first exemplary embodiment described above, except for a structure of a second separator 18, so a repeated description of the same structure will be omitted.

The electrode assembly 80 according to the current third exemplary embodiment includes: a first electrode plate 12; a second electrode plate 13; a third electrode plate 14; a first separator 15 disposed between the first electrode plate 12 and the second electrode plate 13; and a second separator 18 disposed between the second electrode plate 13 and the third electrode plate 14.

The first separator 15 and the second electrode plate 13 are disposed on the first electrode plate 12, and the first electrode plate 12 and the first separator 15 are folded to enclose the second electrode plate 13. On the other hand, the second separator 18 and the third electrode plate 14 are disposed on the first electrode plate 12, and the second separator 18 is folded to enclose the third electrode plate 14. Here, the second electrode plate 13 and the third electrode plate 14 are unfolded.

Figure 8A:
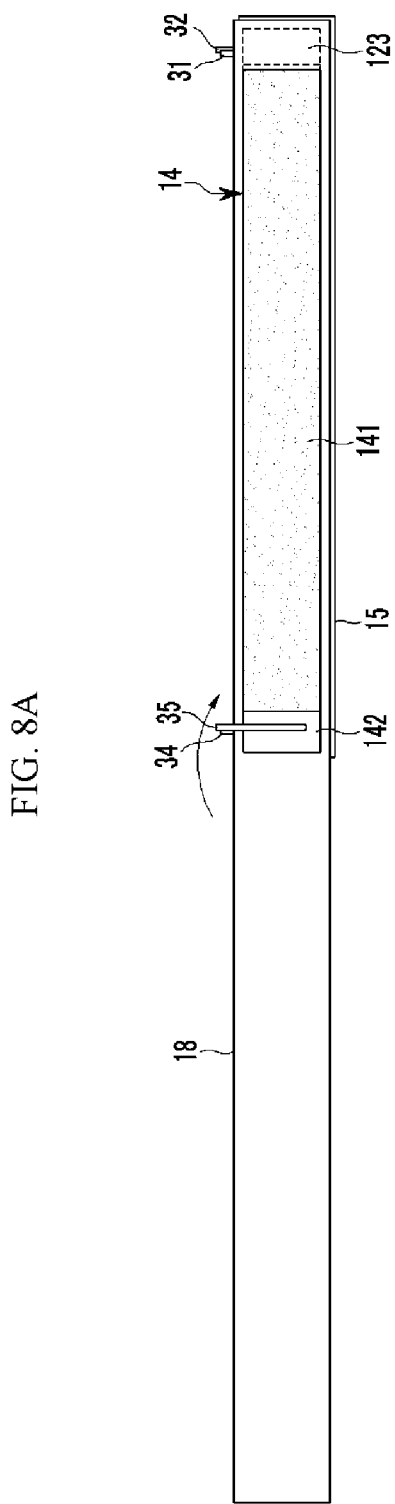
FIG. 8A is a top plan view of a state in which a third electrode plate is provided on a second separator according to the third exemplary embodiment of the present invention.

As shown in FIG. 8A, the second separator 18 has a fifth length L5, the third electrode plate 14 has a third length L3, and the fifth length L5 may be 2 times to 2.2 times the third length L3.

When the third separator is folded as in the current third exemplary embodiment, the number of separators can be reduced, thereby preventing miswinding using the folded separator as well as improving work efficiency.

A manufacturing method of a rechargeable battery according to the current third exemplary embodiment will now be described with reference to FIGS. 8A and 8B.

Figure 8B:
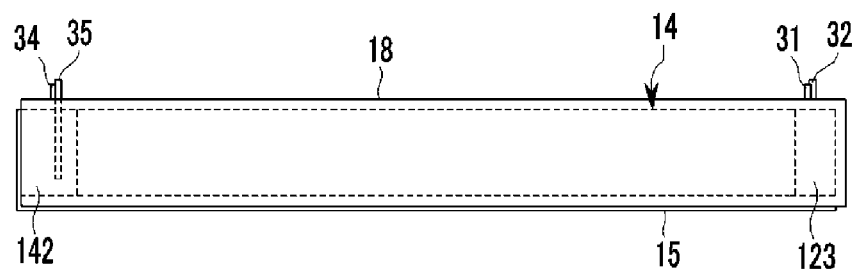
FIG. 8B is a top plan view of a state in which the second separator according to the third exemplary embodiment of the present invention is folded.

FIG. 8A is a top plan view of a state in which a third electrode plate is provided on a second separator according to the third exemplary embodiment of the present invention, and FIG. 8B is a top plan view of a state in which the second separator according to the third exemplary embodiment of the present invention is folded.

As shown in FIG. 8A, the manufacturing method of the rechargeable battery according to the current third exemplary embodiment may include, after disposing a first separator 15 on a first electrode plate 12 and disposing on a second electrode plate 13 on the first separator 15, folding the first separator 15 and the first electrode plate 12 together to enclose the second electrode plate 13 not folded. In addition, the current manufacturing method of the rechargeable battery may include sequentially stacking the second separator 18 and the third electrode plate 14 on the first electrode plate 12 in a folded state. Here, a length of the second separator 18 may be 2 times to 2.2 times that of the third electrode plate 14.

As shown in FIG. 8B, the manufacturing method of the rechargeable battery according to the current third exemplary embodiment may further include folding the second separator 18 to enclose the third electrode plate 14. In addition, the manufacturing method of the rechargeable battery according to the current third exemplary embodiment may further include winding, after the second separator 18 is folded, the electrode plates and the separators using the first electrode tab 31 and the second electrode tab 32 as the winding center.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising an electrode assembly including: a first electrode plate including first and second coated regions where an active material layer is formed and a first uncoated region positioned between the first and second coated regions and not formed with the active material layer and folded at the first uncoated region; a second electrode plate inserted between the folded portions of the first electrode plate; and a first separator inserted between the first and second electrode plates, and a first electrode tab bonded to the first uncoated region, wherein the first electrode plate, the second electrode plate, and the first separator are wound after they are stacked.

2. The rechargeable battery of claim 1, wherein the first uncoated region is positioned in an innermost wound portion of the electrode assembly.

3. The rechargeable battery of claim 1, wherein the first separator is folded together with the first electrode plate to enclose the second electrode plate, and the second electrode plate is unfolded.

4. The rechargeable battery of claim 3, further comprising a second separator disposed outside of the first electrode plate and a third electrode plate stacked on the second separator.

5. The rechargeable battery of claim 4, wherein the second electrode plate and the third electrode plate has the same polarity, and the first electrode plate has a different polarity than the second electrode plate.

6. The rechargeable battery of claim 4, wherein the first electrode plate has a first length, the second electrode plate has a second length that is shorter than the first length, and the third electrode plate has a third length that is shorter than the first length.

7. The rechargeable battery of claim 6, wherein the first length is 1.8 times to 2.2 times the second length and the third length.

8. The rechargeable battery of claim 4, wherein the second separator is formed such that it is folded to enclose the third electrode plate.

9. The rechargeable battery of claim 4, further comprising a third separator disposed outside of the third electrode plate, wherein the first separator has a fourth length, the second separator has a fifth length, and the third separator has a sixth length, and the fourth length is 1.8 times to 2.2 times the fifth length and the sixth length.

10. The rechargeable battery of claim 4, further comprising a second electrode tab welded to the first uncoated region and overlapped with the first electrode tab while interposing the first electrode plate therebetween.

11. The rechargeable battery of claim 10, wherein the first electrode tab is inserted in between the folded first electrode plate, and the second electrode tab is positioned outside of the first electrode plate.

12. The rechargeable battery of claim 10, wherein the first electrode tab and the second electrode tab are bonded to the outside of the first electrode plate such that they are separated from each other while interposing the first electrode plate therebetween.

13. The rechargeable battery of claim 10, wherein the first electrode tab and the second electrode tab are disposed away from a center of the first uncoated region in a width direction thereof.

14. The rechargeable battery of claim 4, wherein the second electrode plate includes a third coated region where an active material layer is formed and a second uncoated region positioned in an end portion of the second electrode plate in a length direction thereof and where an active material layer is not formed, the third electrode plate includes a fourth coated region in which an active material layer is formed and a third uncoated region positioned in an end portion of the third electrode plate in a length direction thereof and where an active material layer is not formed, the electrode assembly further includes a third electrode tab bonded to the second uncoated region and a fourth electrode tab bonded to the third uncoated region, and the third electrode tab and the fourth electrode tab are positioned in an outermost wound portion of the electrode assembly.

15. A method of manufacturing a rechargeable battery comprising:
    providing a first electrode plate having a first uncoated region formed between a first coated layer and a second coating layer and a second electrode plate wherein the first uncoated region includes a first electrode tab;
    positioning the second electrode plate and a first separator adjacent a first uncoated region of the first electrode plate;
    folding the first electrode plate at the first uncoated region to enclose the second electrode plate with the first electrode plate and the first separator; and
    winding the folded first electrode plate and the second electrode plate using he first electrode tab provided in the first uncoated region as a winding center.

16. The manufacturing method of claim 15, comprising the first separator on the first electrode plate having a first length; positioning the second electrode plate having a second length smaller than the first length on the first separator; folding the first electrode plate and the first separator in order for the first separator and the first electrode plate to enclose the second electrode plate; positioning a second separator outside of the first electrode plate; positioning a third electrode plate having a third length smaller than the first length on the second separator; and winding them around the first electrode tab provided in the first uncoated region.

17. The manufacturing method of claim 16, further comprising: bonding the first electrode tab to the first uncoated region; and bonding the second electrode tab to the first uncoated region to face the first electrode tab.

18. The manufacturing method of claim 17, further comprising providing a third electrode tab in the second electrode plate and providing a fourth electrode tab in the third electrode plate, wherein the winding includes positioning the first electrode tab and the second electrode tab in an innermost wound portion of the electrode assembly, and positioning the third electrode tab and the fourth electrode tab in an innermost wound portion of the electrode assembly.

19. The manufacturing method of claim 16, further comprising positioning a third separator on the third electrode plate.

20. The manufacturing method of claim 16, further comprising folding of the second separator by folding the second separator to enclose the second electrode plate.

* * * * *